United States Patent [19]

Müller

[11] Patent Number: 4,615,711

[45] Date of Patent: Oct. 7, 1986

[54] SEWAGE SLUDGE FUEL BRIQUETTE

[76] Inventor: Dietrich Müller, Handelmannweg 1, D 2000 Hamburg 52, Fed. Rep. of Germany

[21] Appl. No.: 766,402

[22] Filed: Aug. 16, 1985

Related U.S. Application Data

[62] Division of Ser. No. 554,712, Nov. 23, 1983, Pat. No. 4,552,666.

[30] Foreign Application Priority Data

Nov. 26, 1982 [DE] Fed. Rep. of Germany ....... 3243827

[51] Int. Cl.$^4$ ................................................ C10L 5/44
[52] U.S. Cl. ...................................... 44/10 A; 44/1 D
[58] Field of Search ............... 44/1 D, 10 A; 210/710

[56] References Cited

U.S. PATENT DOCUMENTS

| 4,272,322 | 6/1981 | Kobayashi | 44/1 D |
| 4,420,320 | 12/1983 | Hartmann et al. | 44/1 D |

FOREIGN PATENT DOCUMENTS

| 3320087 | 12/1984 | Fed. Rep. of Germany | 44/10 A |
| 2270315 | 12/1975 | France | 44/1 D |
| 81/03029 | 10/1981 | PCT Int'l Appl. | 44/1 D |
| 1198958 | 7/1970 | United Kingdom | 44/1 D |

*Primary Examiner*—Carl F. Dees
*Attorney, Agent, or Firm*—Cushman, Darby & Cushman

[57] ABSTRACT

The invention relates to a process, which is characterized by mixing sewage sludge with comminuted, dried autumn foliage or the solvent extraction residue thereof. It also relates to the use of the deformable and optionally dried material obtained as a fuel briquette, and the use of the ash obtained after burning the fuel briquette as a fertilizer component.

3 Claims, No Drawings

SEWAGE SLUDGE FUEL BRIQUETTE

This is a division of application Ser. No. 554,712 filed Nov. 23, 1983, now U.S. Pat. No. 4,552,666.

BACKGROUND OF THE INVENTION

The invention relates to a process for the treatment of digested sewage sludge, as well as the use of the products obtained as fuel briquettes or as a supply of fertilizer components.

The elimination of sewage sludge causes considerable difficulties, particularly in connection with municipal drainage. The hitherto adopted practice of dumping the sludge into the sea is not only uneconomical due to the high transportation costs, but to protect the environment is also only possible to a limited extent.

The treatment of sewage sludge for obtaining usable end products or harmless constituents is an important problem, particularly in large cities. It is known that sewage sludge can be digested for obtaining methane, or can be stored. This involves considerable costs for the storage tanks and the removal of the digested sewage sludge still constitutes a problem. The use of concentrated sewage sludge as a soil conditioner is problematical, due to the low concentration of substances having a fertilizing action.

It is also known to concentrate the sewage sludge or the digested sewage sludge with a solids content of approximately 2 to 5% in a settling tank, until a solids content of approximately 10% by weight is obtained. The predrained or concentrated sludge can then be further concentrated to a solids content of approximately 30 to 50% by weight by means of centrifuges or filter presses. Both sludge concentration in settling tanks and draining by centrifuges and filter presses are extremely uneconomical, particularly as a considerable amount of energy is required for the final sludge drying to a residual water content below 50%, while still not leading to the elimination of the dried residual sludge.

The problem of the present invention is to treat sewage sludge and particularly digested sewage sludge in such a way that no by-products prejudicial to the environment are obtained and so that the resulting products can be advantageously used.

SUMMARY OF THE INVENTION

For the solution of this problem, there is proposed a process for the treatment of digested sewage sludge which process is characterized by the sewage sludge is mixed with dried autumn foliage or the extraction residue thereof.

It has surprisingly been found that dried, ground autumn foliage or the solvent extraction residue thereof can be used in a highly advantageous manner for sedimenting sewage sludge and, upon adding large quantities, plastically deformable materials are obtained which, optionally after further drying, give fuel briquettes, which have a considerable calorific value. The ash of such fuel briquettes supplies a considerable concentration of substances active as fertilizers.

It has already been proposed according to DOS No. 3243282.8 and corresponding Muller U.S. application Ser. No. 554,713, filed Nov. 23, 1983, entitled "Process And Apparatus For Obtaining Raw Materials From Autumn Foliage", the entire disclosure of which is hereby incorporated by reference and relied upon, that the autumn foliage obtained in great quantities be comminuted for obtaining raw materials, followed by drying and extraction in one or more stages. Valuable constituents can be separated from the extracts and the residue can be used as fuel. Both the comminuted or ground autumn leaves, as well as the residue after the extraction thereof are particularly suitable for binding the ballast water from sewage sludge. In general one part by weight of ground leaves to between 3 and 6 parts by weight of sewage sludge, or one part by weight of solvent extraction residue of ground leaves per 6 to 10 parts by weight of sewage sludge, in each case based on a sewage sludge with a 10% by weight solids content, is suitable for obtaining from the sludge a plastically deformable material which, after drying, can be used as fuel briquettes. Sewage sludge with a higher or lower solids content requires higher or lower added leaf quantities in order to bind the ballast water thereof. On a dry basis for example for one part by weight of ground leaves there can be employed 0.3 to 0.6 of the sewage sludge for one part of solvent extraction residue 0.6 to 1.0 part of the sewage sludge.

According to a particularly preferred process, the sewage sludge is mixed in stages with the autumn foliage or its solvent extraction residue. At least part of the water can be removed from the sewage sludge prior to said addition, or prior to a partial addition. For example, a sludge already concentrated in the settling tank can be mixed with the comminuted and dried foliage or its solvent extraction residue. It is also possible to mix in smaller proportions previously untreated sludge or a sludge which has already been thickened to an approximately 15% solids content, with the autumn foliage or its extraction residue. Following sedimentation of the solids, further water is extracted, in order to produce a plastically deformable material, following further addition of autumn foliage or its extraction residue.

It is surprising that the comminuted dried autumn foliage or its solvent extraction residue can counteract the high water binding capacity of sewage sludge and that the thickened sewage sludge binds the mixture into a cohesive plastic material. It is also surprising that the thus obtained deformable materials can easily be briquetted and relatively rapidly dried in air. This can in fact take place to residual moisture contents of approximately 4% whereas, without the addition of leaves, the drying of sewage sludge alone stops at about 14%.

As a result of the process according to the invention the difficult to handle and difficult to burn sewage sludge leads to a valuable fuel material due to the addition of comminuted and dried autumn foilage or the solvent extraction residue thereof. The sewage sludge proportion represents 3,300 kcal/kg of dry substance and the autumn foilage proportion is approximately 5,000 kcal/kg.

The fuel briquettes obtained burn in much the same way as lignite briquettes. Due to the sewage sludge proportion, the ash content is relatively high, but contains a number of inorganic water-soluble salts and particularly compounds containing potassium, nitrogen and phosphorus, which can be used as fertilizers after corresponding further processing and after separation from the heavy metals present.

The invention is further illustrated hereinafter by means of examples.

DETAILED DESCRIPTION

Example 1

Fallen, mixed autumn foliage of different roadside trees picked up on a rainy day by the garbage truck of a German city were dried indoors for 48 hours, so that 62.5% by weight of the water was removed. This material was comminuted to approximately 1/25 of its initial volume.

4,000 g of municipal sewage sludge with a 10% by weight solids content were thoroughly mixed with 871 g of the dried, comminuted autumn foliage and were converted into a plastic material in a kneader. The plastic material was formed into fuel briquettes, which were dried in air. These briquettes burned with a yellow flame and gave a calorific value of approximately 4,300 kcal/kg.

Example 2

Comminuted, dried autumn foliage was extracted in three-stage manner with acetone/methanol/water according to DOS No. 3243282.8 and the aforementioned Muller U.S. application Ser. No. 554,713, filed 11-23-83, (Example 7) and the extraction residue was dried in air. 4,000 g of a sewage sludge according to Example 1 were processed with 485 g of this extraction residue of dried autumn foliage until a shapable mixture was obtained. Cubes were formed from this mixture and dried to a residual moisture content of approximately 4%. It was possible to burn test cubes weighing approximately 2 g over a moderately powerful Bunsen flame in a procelain crucible, the briquette material igniting after 45 seconds and burning for approximately 3 minutes with a yellow flame. The ash was washed out with cold water giving 21.4% of water-soluble constituents containing 0.35 mg/l of phosphorus, 20 mg/l of $NO_3$, and 100 mg/l of potassium and 8 mg/l of $NH_4$, as well as heavy metals.

Example 3

Approximately 20% of the necessary quantity, i.e. 12 g of dried, comminuted autumn foliage were stirred into a settling tank with approximately 250 ml of digested sewage sludge and a solids content of approximately 3% by weight. A relatively rapid sedimentation of the turbidities was observed after approximately 4 hours. The relatively clear, aqueous liquid was decanted or sucked off. The remaining quantity of the dried autumn foliage, namely 48 g, was then stirred in, until a kneadable material was obtained, which could be processed into briquettes and dried in air.

In the solvent extraction as set forth in the above mentioned Muller U.S. patent application, different solvent groups can be used with different dielectric constants and e.g. in a three-stage extraction, it is possible to start with solvents having a lower dielectric constant and then continuing the extraction in stages with solvents having higher dielectric constants. In such a multistage extraction process, different products are obtained in each stage.

When using solvents with a dielectric constant of $\xi = <30$ (solvent group A) 4 to 10% by weight of waxes, resins, essential oils and alkaloids are obtained. Examples of such solvents are trichloroethylene, Katron 113 or acetone.

By extraction with solvents having a dielectric constant of $\xi = 30-80$ (solvent group B), 10 to 20% by weight of carbohydrate, protein, dyes, tannins, organic bases, acids or salts are obtained. Examples of such solvents are methanol and water.

When using solvents with a dielectric constant of $\xi = >80$ (solvent group C), 10 to 20% by weight of pectins and pentosans are obtained. Examples of such solvents are aqueous sulfuric acid, aqueous potassium, hydroxide and aqueous sodium hydroxide.

Through the use of solvents, whose dielectric constants are at the limits of the aforementioned ranges and by using solvent mixtures, including those which distill azeotropically, the raw materails obtained with the aforementioned solvent groups can be obtained together, e.g. A+B together and C separately, or A separately and B+C together.

There can also be used two different solvents in the same group, e.g. methanol followed by water (both being in Group B).

What is claimed is:

1. A deformable fuel briquette shaped from the product made by either (1) a process for the treatment of digested sewage sludge consisting essentially of mixing the sewage sludge with comminuted, dried autumn foliage until a deformable material is obtained, the proportions of autumn foliage to sewage sludge on a dry basis being from 0.3 to 0.6 parts of sewage sludge per part of comminuted autumn foliage and being such that the mixture is bound into a cohesive plastic material, a part of the water being removed from the sewage sludge either prior to the addition of the total autumn foliage, or after a partial addition thereof or (2) a process for the treatment of digested sewage sludge consisting essentially of mixing the sewage sludge with the solvent extraction residue of comminuted, dried, autumn foliage, the proportions of or solvient extraction residue of autumn foliage to sewage sludge being such that the mixture is bound into a cohesive plastic material, and that on a dry basis there is employed 0.6 to 1.0 part of sewage sludge per part of solvent extraction residue, wherein the solvent employed in the extraction being in either (1) solvent group A having a dielectric constant of $\xi = <30$, (2) solvent group B having a dielectric constant of $\xi = 30$ to 80 or (3) solvent group C having a dielectric constant of $\xi = >80$, a part of the water being removed from the sewage sludge either prior to the addition of the total solvent residue extraction residue of autumn foliage or after a partial addition thereof.

2. A process according to claim 1 wherein there is employed comminuted autumn foliage.

3. A process according to claim 1 wherein there is employed the solvent extraction residue of comminuted autumn foliage.

* * * * *